United States Patent
Chen et al.

(10) Patent No.: US 6,615,336 B1
(45) Date of Patent: Sep. 2, 2003

(54) METHOD FOR PERFORMING A MEDIUM ACCESS CONTROL ADDRESS LOOKUP IN A NETWORK SWITCH OF AN ETHERNET NETWORK

(75) Inventors: Jen-Kai Chen, Taipei (TW); Wei-Pin Chen, Taipei (TW); Jiann-Hwa Liou, Taichung (TW)

(73) Assignee: Via Technologies, Inc., Taipei (TW)

( * ) Notice: Subject to any disclaimer, the term of this patent is extended or adjusted under 35 U.S.C. 154(b) by 0 days.

(21) Appl. No.: 09/481,713

(22) Filed: Jan. 12, 2000

(30) Foreign Application Priority Data

Jul. 16, 1999 (TW) ........................................ 88112055 A

(51) Int. Cl.$^7$ ............................................... G06F 12/02
(52) U.S. Cl. .................... 711/202; 711/171; 370/351
(58) Field of Search ................. 711/202, 171; 370/351

(56) References Cited

U.S. PATENT DOCUMENTS

| | | | | |
|---|---|---|---|---|
| 5,649,109 A | * | 7/1997 | Griesmer et al. ............ 709/242 |
| 5,914,938 A | * | 6/1999 | Brady et al. ................ 370/254 |
| 6,192,051 B1 | * | 2/2001 | Lipman et al. ............. 370/389 |
| 6,266,705 B1 | * | 7/2001 | Ullum et al. ............... 709/238 |
| 6,343,078 B1 | * | 1/2002 | Bronstein et al. .......... 370/400 |
| 6,366,617 B1 | * | 4/2002 | Ryan ..................... 375/240.25 |

\* cited by examiner

*Primary Examiner*—Hiep T. Nguyen
(74) *Attorney, Agent, or Firm*—Rabin & Berdo, P.C.

(57) ABSTRACT

A method for performing a MAC address lookup in a network switch of an Ethernet network is provided, using a memory structure including a number of multi-slot buckets. Each of the multi-slot buckets is mapped to a hash key derived from a MAC Address. Each of the multi-slot buckets has a number of forwarding table section, each storing a number of the forwarding table entries. If two forwarding table entries are stored in each forwarding table section of a 4-slot bucket ¼ memory space and ½ access time can be saved. Thus, the lookup for the forwarding table according to the MAC address in the Ethernet switch IC can be effectively performed.

11 Claims, 2 Drawing Sheets

| 127 | 107 | 106 | 105 | 101 100 | 64 | 63 | 43 | 42 | 41 | 37 | 36 | 0 |
|---|---|---|---|---|---|---|---|---|---|---|---|---|
| other fields | static flag | source port | MAC content | | | other fields | | static flag | source port | | MAC content | |

| | | |
|---|---|---|
| forwarding table entry(k,1) | forwarding table entry(k,0) | ⌐ 50 |
| forwarding table entry(k,3) | forwarding table entry(k,2) | ⌐ 52 |
| port mask(k,3) port mask(k,2) | port mask(k,1) port mask(k,0) | ⌐ 54 |
| forwarding table entry(k+1,1) | forwarding table entry(k+1,0) | |
| ⋮ | ⋮ | |

| forwarding table entry(k,0) |
| forwarding table entry(k,1) |
| forwarding table entry(k,2) |
| forwarding table entry(k,3) |
| forwarding table entry(k+1,0) |
| forwarding table entry(k+1,1) |
| ⋮ |

| 127 80 | 79 62 | 61 | 60 42 | 41 37 | 36 0 |
|---|---|---|---|---|---|
| preserved bits | other fields | static flag | port mask | source port | MAC content |

FIG. 3 (PRIOR ART)

| 127 107 | 106 105 | 101 100 | 64 63 | 43 42 | 41 37 | 36 0 |
|---|---|---|---|---|---|---|
| other fields | static flag | source port | MAC content | other fields | static flag | source port | MAC content |

FIG. 4

| forwarding table entry(k,1) | forwarding table entry(k,0) | 50 |
|---|---|---|
| forwarding table entry(k,3) | forwarding table entry(k,2) | 52 |
| port mask(k,3) \| port mask(k,2) \| port mask(k,1) \| port mask(k,0) | | 54 |
| forwarding table entry(k+1,1) | forwarding table entry(k+1,0) | |
| ⋮ | ⋮ | |

FIG. 5

METHOD FOR PERFORMING A MEDIUM ACCESS CONTROL ADDRESS LOOKUP IN A NETWORK SWITCH OF AN ETHERNET NETWORK

BACKGROUND OF THE INVENTION

This application incorporates by reference Taiwanese application Serial No. 88112055, Filed Jul. 16, 1999.

1. Field of the Invention

The invention relates in general to a memory access in the Ethernet, and more particularly to an improved hashing scheme where the original entries in the multi-slot bucket are separated as entries and port masks in different location.

2. Description of the Related Art

Lookup of the forwarding table for destination medium access control (MAC) addresses is a basic operation in the Ethernet switch integrated circuit (IC). In the Ethernet, a server is provided with a switch hub for transmitting data among different hosts. A switch IC chip deposed in the switch hub connects the hosts according to the forwarding table. Conventionally, the forwarding table is established in a static random access memory (SRAM) in order to reduce system cost.

Referring to FIG. 1, a transmitter (computer) 10 is coupled to a port 12 of the switch hub 11 while a receiver (computer) 16 is connected to the switch hub 11 via a port 15. The data, forwarded from the transmitter 10, is received by a switch IC chip 14 of the switch hub II, and then passed on to the receiver 16.

In FIG. 1, the data of the transmitter 10 can be received by the receiver 16 because the MAC address of the receiver 16 is also sent out along with the data. The MAC address, including the address of the port 15 connected by the receiver 16, is received by the switch IC chip 14, and then transmitted to a SRAM 18 for the forwarding table lookup by a 128-bit data bus 17. Lookup for the forwarding table according to the MAC address decides the destination where the data is to be transmitted.

The size of the MAC address is 48 bits and the total number of computers in a local area network (LAN) usually comes to tens or hundreds. Conventionally, a hashing algorithm is employed to map the MAC address to a hash key for lookup of the forwarding table. The hash key is composed of 11 bits in the 48-bit MAC address so that the required memory is not costly.

However, owing to the fact that MAC addresses of different computers may have the same corresponding hash key, the above-mentioned hashing algorithm may result in a problem that the hash keys of different computers may conflict with each other. For example, an 11-bit hash key can correspond to $2^{11}$ different MAC addresses in total. In a company, if there are 400 clients in the Ethernet, the probability that all hash keys are different with each other is $(2^{11}-1)/2^{11} \times (2^{11}-2)/ 2^{11} \times (2^{11}-3)/2^{11} \times (2^{11}-4)/2^{11} \times \ldots (2^{11}-397)/2^{11} \times (2^{11}-398)/ 2^{11} \times (2^{11}-399)/2^{11} \approx 0$. That is to say, it is very possible that at least two of these hash keys are the same in this case.

In the prior art, a multi-slot bucket scheme is employed to reduce the probability of hash key conflict. The forwarding table is composed of continuous multi-slot buckets, each bucket corresponding to a unique hash key and having multi-slots to store individual forwarding table entries. Given a MAC address, a hash key can be derived and mapped to the corresponding multi-slot bucket.

The 4-slot bucket is taken for example as shown in FIG. 2. The lookup for the forwarding table is performed as follows. The hash key, derived from a given MAC address, is mapped to the corresponding kth 4-slot bucket. Then, the MAC address is used to compare with the first forwarding table entry (k, 0) of the kth 4-slot bucket. If the MAC field of this entry (k, 0) is not consistent with the content of the MAC address, the next entry (k, 1) will be tried again. The forwarding table entries (k, 2) and (k, 3) will be tried successively if the former entries (k, 0) and (k, 1) are not identical with the MAC address. Therefore, there are up to 4 tries for a lookup. In practice, the probability of lookup miss will be very small. However, it requires four table entry accesses to SRAM in the worst case.

The memory space and the access time are usually considered to be the most important aspects in the IC design. Therefore, if the memory space used for lookup of the forwarding table and the access time of memory can be effectively reduced, the efficiency of the conventional hashing algorithm can be greatly improved.

SUMMARY OF THE INVENTION

It is therefore an object of the invention to provide a method for performing a MAC address lookup in a network switch to enable data transmission to a network node associated with the MAC address in an Ethernet network. This method is an improved hashing scheme in the Ethernet where the rarely used field is separated from each forwarding table entry so that memory space can be saved for storing more forwarding table entries, and thus the access time of memory can be effectively reduced.

The invention achieves the above-identified objects by providing a memory structure in the Ethernet. The memory structure includes a plurality of multi-slot buckets. Each of the multi-slot buckets is mapped to a hash key that is formed by partial bits in a MAC address. Besides, each of the multi-slot buckets has a number of forwarding table sections, each storing a number of forwarding table entries. If two forwarding table entries are stored and read by a burst read mode in each forwarding table section of a 4-slot bucket, ¼ memory space and ½ access time can be saved.

The invention achieves another object by providing a memory access method. First, a hash key of a MAC address is mapped to a multi-slot bucket of a forwarding table in a memory. Then, a number of forwarding table entries are read from a forwarding table section of the multi-slot bucket by a burst read mode. If two forwarding table entries are stored in each forwarding table section of a 4-slot bucket, ¼ memory space and ½ access time can be saved. Thus, the lookup for the forwarding table according to the MAC address in the Ethernet switch IC can be effectively performed.

BRIEF DESCRIPTION OF THE DRAWINGS

Other objects, features, and advantages of the invention will become apparent from the following detailed description of the preferred but non-limiting embodiments. The description is made with reference to the accompanying drawings in which:

FIG. 3 (Prior Art) illustrates the structure of the conventional 128 bit forwarding table entry;

FIG. 4 illustrates the structure of a forwarding table entry according to a preferred embodiment of the invention; and FIG. 5 illustrates the structure of 4-slot buckets in the forwarding table according to the invention.

DESCRIPTION OF THE PREFERRED EMBODIMENT

Figures 1, 2:
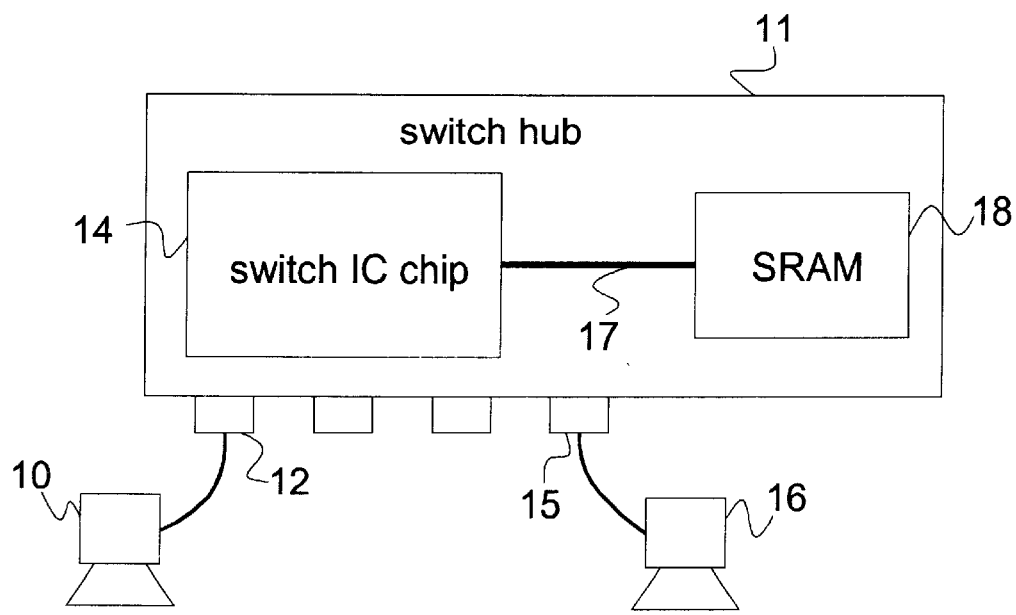
FIG. 1 (Prior Art) illustrates a block diagram of the searching system of forwarding tables of the Ethernet.
FIG. 2 (Prior Art) illustrates the structure of a conventional 4-slot bucket.

As mentioned above, the conventional hashing algorithm can be improved by saving the memory space in the multi-slot buckets.

Referring to FIG. 3, the structure of the conventional 128-bit forwarding table entry is shown. The 128-bit forwarding table entry (0, 127) consists of 37 bits for the MAC content (0, 36), 5 bits for the source port (37, 41), 9 bits for the port mask (42, 60), one bit for the static flag (61), 18 bits for other fields (62, 79), and 48 reserved bits (80, 127). Except the hash key (11 bits), the MAC address (48 bits) includes another 37 bits for comparing with the MAC content (0, 36). The static flag (61) and the port mask (42, 60) are usually used for well-known multicast Ethernet addresses, such as multicast Ethernet addresses relative to the transmission packet of the internet group management protocol (IGMP).

However the static multicast contents, such as the static flag and the port mask, in the forwarding table entry mentioned above are rarely used. According to the invention, the rarely used port mask is separated form the original forwarding table entry and moved to the next neighboring entry and the preserved bits (80, 127) are omitted. Therefore, the adjusted forwarding table entry only includes the MAC content, the source port, the static flag, and other fields.

Referring to FIG. 4, the structure of a forwarding table entry according to a preferred embodiment of the invention is illustrated. Taking a 128-bit forwarding table entry for example, each forwarding table entry consists of 37 bits for the MAC content (0, 36), 5 bits for the source port (37, 41), one bit for the static flag (42), 21 bits for other fields (43, 63), 37 bits for another MAC content (64, 100), 5 bits for another source port (101, 105), one bit for another static flag (106), and 21 bits for other fields (107, 127). That is to say, each 128-bit forwarding table entry is divided into two 64-bit forwarding table entries. Then, it only needs a 64-bit data bus to access these entries. Besides, by utilizing the burst read mode, the access of the two 64-bit entries divided by the original 128-bit forwarding table entry can be achieved at the same time.

Referring to FIG. 5, the structure of 4-slot buckets in the forwarding table according to the invention is illustrated. A hash key is firstly mapped to the kth 4-slot bucket. The first forwarding table entry (k, 0) and the second forwarding table entry (k, 1) of the kth 4-slot bucket are located in the first forwarding table section 50. The third entry (k, 2) and the fourth entry (k, 3) of the kth 4-slot bucket are located in the second forwarding table section 52. Moreover, the port masks separated from the original entries are located in the third forwarding table section 54. By utilizing the burst read mode, the two couples of entries (k, 0), (k, 1) and (k, 2), (k, 3) can be read at the same time.

Because two forwarding table entries (k, 0), (k, 1) or (k, 2), (k, 3) can be read simultaneously, the probability that lookup for the forwarding table according to the MAC address is accomplished in the first forwarding table section 50 is rather high. If the lookup fails, i.e. neither of the two MAC fields (k, 0), (k, 1) is consistent with the content of the MAC address, the entries (k, 2), (k, 3) in the next forwarding table section 52 will be tried again. Obviously, the burst read mode is also used in the second try.

In general there are three types of transmission in the Ethernet. They are the broadcast, the multicast, and the unicast. The broadcast refers to the incoming data being transmitted to all the networks while the multicast implies the incoming data being transmitted to a number of the appointed network addresses, and the unicast implies the incoming data being transmitted to a single network address. When the multicast has to be utilized in the Ethernet, the bits for the port mask are needed. However this kind of network transmission is rarely used.

If the bits of the port mask are needed, the third forwarding table section 54 of the kth 4-slot bucket should be utilized. The third forwarding table section 54 includes the bits for the first port mask (k, 0), the bits for the second port mask (k, 1), the bits for the third port mask (k, 2), and the bits for the fourth port mask (k, 3), as shown in FIG. 5. Furthermore, because the port masks in the third forwarding table section 54 are rarely used, the third forwarding table section 54 can also be separated from the 4-slot bucket so that the disposition of the 4-slot bucket is more convenient.

Therefore, according to the embodiment of the invention, it takes at most 3 times for a lookup of the forwarding table. Because two forwarding table entries are read at a time by the burst read mode, the lookup can be mostly completed in the first try. Unless the lookup fails in the first try, the second try or memory access will be unnecessary. However, the lookup can be completed at most in the second access. Compared to the conventional algorithm that there are up to 4 times for a lookup, the invention saves ½ access time in average. In addition, in each 4-slot bucket, only three forwarding table sections, each having 128 bits, are needed for storing the four 128-bit forwarding table entries for the preserved bits are omitted. Thus, ¼ memory space can be saved as well. As for the MAC address of the static multicast, the lookup for the forwarding table can be mostly completed in the second try, and even in the third try in the worst case. Compared to the conventional algorithm that requires 4 times of access, the access time of memory in the invention is shortened as well.

In this preferred embodiment, the 4-slot bucket and forwarding table sections for storing two forwarding table entries are taken for example. However, the technical features disclosed by the invention are not limited to the above-mentioned embodiment. For example, the invention can be applied to the technology that a number of forwarding table entries are stored in the same forwarding table section of each multislot bucket.

It is therefore a feature of the invention to improve the hashing scheme of the multi-slot bucket. That is, the preserved bits in the forwarding table entry are omitted and the rarely used bits for the port mask are separated from the original entry. Besides, each forwarding table section in the multi-slot bucket can store at least two forwarding table entries rather than only one forwarding table entry. Therefore, memory space for the forwarding table entries along with the access time can be reduced.

It is another feature of the invention that the bandwidth requirement of continuous memory access can be reduced. Because the size of each forwarding table entry is only 64 bits in the improved hashing scheme of the multi-slot bucket, the data bus needed for transmission is also 64 bits only. Besides, the burst read mode is employed to access two entries at a time. Thus, the bandwidth requirement of continuous memory access can be reduced.

It is still another feature of the invention that more than one forwarding table entry can be read in each access for each forwarding table section in the multi-slot bucket includes more than one forwarding table entry. For example, compared to the conventional scheme, if two forwarding table entries can be stored in each forwarding table section of the 4-slot bucket, about ½ access time can be saved. Therefore, the lookup for the forwarding table in the Ethernet switch IC can effectively completed. While the invention has been described by way of example and in terms of the -preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A memory structure for storing a forwarding table in a memory of a network switch of an Ethernet network so as to facilitate a medium access control (MAC) address lookup in the network switch, the memory structure comprising:

a plurality of multi-slot buckets, wherein each of the multi-slot buckets is mapped to a hash key which is formed by partial bits in a MAC address that is used for data transmission, wherein each of the multi-slot buckets comprises:

a first forwarding table section for storing a first forwarding table entry and a second forwarding table entry;

a second forwarding table section for storing a third forwarding table entry and a fourth forwarding table entry; and a third forwarding table section for storing port masks associated with the first, second, third, and fourth forwarding table entries;

wherein the first, second, third, and fourth forwarding table entries each have respective data fields for MAC content, source port, and static flag, excluding the associated port masks;

wherein the first, second, and third forwarding table sections are separately read from the multi-slot bucket in a burst mode via a data bus whose bus width is less than a data length of each of the first, second, and third forwarding table sections;

wherein the port masks stored in the third forwarding table section are read from the multi-slot bucket only when the data transmission is multicast; and whereby the MAC address lookup is completed within at most three times of reading the memory of the network switch.

2. A memory structure according to claim 1, wherein the data length of the first, second, and third forwarding table sections is 128-bit and the bus width is 64-bit.

3. A memory structure according to claim 2, wherein the memory is connected to a switch integrated circuit (IC) chip by the 64-bit data bus.

4. A method for performing a MAC address lookup in a network switch to enable data transmission to a network node associated with the MAC address in an Ethernet network, the method comprising the steps of:

mapping a hash key of a MAC address to a four-slot bucket of a forwarding table stored in a static random access memory (SRAM) of the network switch, wherein the four-slot bucket has first, second, and third forwarding table sections, the first forwarding table-section has first and second forwarding table entries, the second forwarding table section has third and fourth forwarding table entries, and the third forwarding table section has four corresponding port masks of the first, second, third, and fourth forwarding table entries;

reading the first forwarding table section of the four-slot bucket from the SRAM in a burst read mode and receiving the first forwarding table section at a switch integrated circuit connected to the SRAM via a 64-bit data bus;

determining, at the switch integrated circuit, whether an entry obtained from the first forwarding table section matches the hash key and, if not, reading the second forwarding table section of the four-slot bucket from the SRAM in the burst read mode and receiving the second forwarding table section at the switch integrated circuit connected to the SRAM via the 64-bit data bus; and determining, at the switch integrated circuit, whether the data transmission is multicast and, if so, reading the third forwarding table section from the four-slot bucket from the SRAM in a burst read mode and receiving the first forwarding table section at the switch integrated circuit connected to the SRAM via the 64-bit data bus.

5. A method according to claim 4, wherein each of the first, second, third, and fourth forwarding table entries has a data length of not larger than 64 bits, including data items for corresponding MAC content, source port, and static flag but not including the corresponding port masks.

6. A method for performing a MAC address lookup in a network switch to enable data transmission to a network node associated with the MAC address in an Ethernet network, the method comprising the steps of:

(a) mapping a hash key of a MAC address to a multi-slot bucket of a forwarding table stored in a memory of the network switch, wherein the multi-slot bucket has first, second, and third forwarding table sections; the first and second forwarding table section each include respective forwarding table entries; and the third forwarding table section has corresponding port masks of the forwarding table entries;

(b) reading the first forwarding table section of the multi-slot bucket;

(c) determining whether an entry obtained from the first forwarding table section matches the hash key and, if not, reading the second forwarding table section of the multi-slot bucket; and (d) determining whether the data transmission is multicast and, if so, reading the third forwarding table section from the multi-slot bucket.

7. A method according to claim 6, wherein each of the forwarding table entries has a data length of not larger than 64 bits, including data items for corresponding MAC content, source port, and static flag but not including the corresponding port masks.

8. A method according to claim 6, wherein the multi-slot bucket is a four-slot bucket of the forwarding table, the first forwarding table section has first and second forwarding table entries, the second forwarding table section has third and fourth forwarding table entries, and the third forwarding table section has four corresponding port masks of the first, second, third, and fourth forwarding table entries.

9. A method according to claim 8, wherein each of the first, second, third, and fourth forwarding table entries has a data length of not larger than 64 bits, including data items for corresponding MAC content, source port, and static flag but not including the corresponding port masks.

10. A method according to claim 6, wherein said step (b) comprises the step of:

reading the first forwarding table section of the multi-slot bucket from the memory in a burst read mode and receiving the first forwarding table section at a switch integrated circuit connected to the memory via a 64-bit data bus.

11. A method according to claim 10, wherein said step (c) comprises the step of:

if an entry obtained from the first forwarding table section does not match the hash key, reading the second forwarding table section of the four-slot bucket from the memory in the burst read mode and receiving the second forwarding table section at the switch integrated circuit which is connected to the memory via the 64-bit data bus.

* * * * *